Sept. 3, 1946. A. CROFT 2,407,060
FRICTION CLUTCH
Filed June 5, 1944
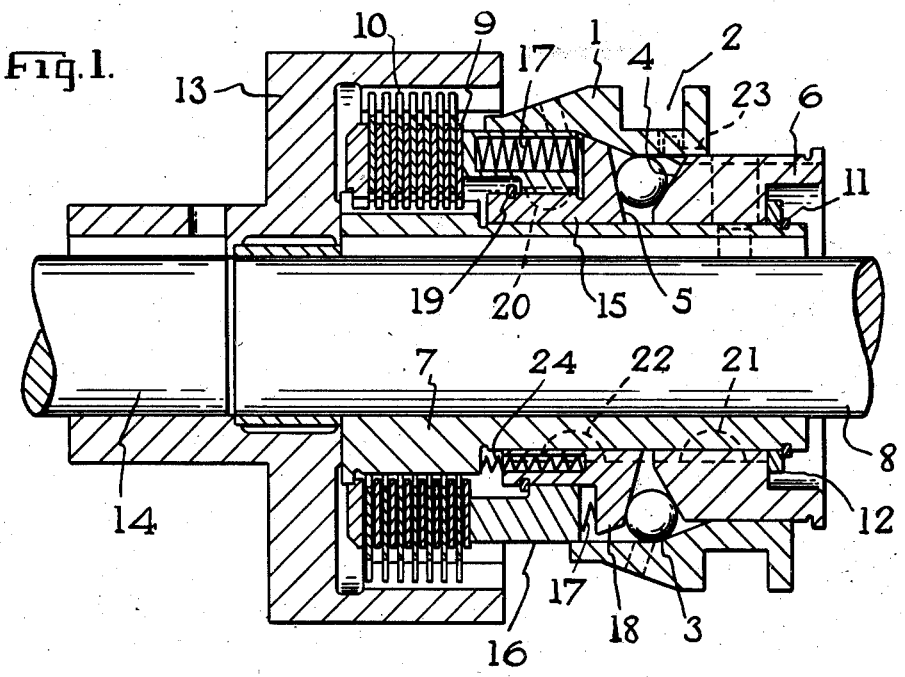
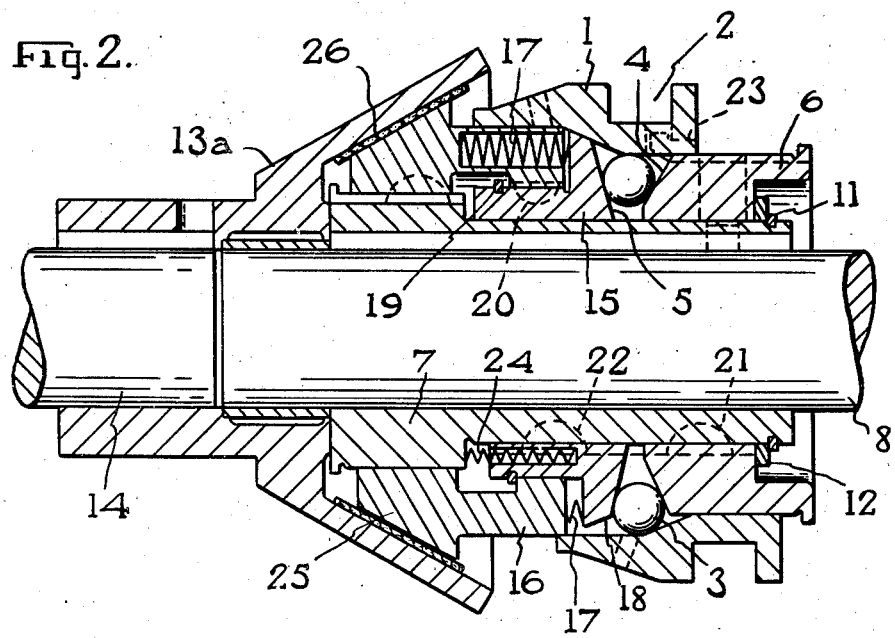
Inventor:
Arthur Croft.
by Pierce & Scheffler,
Attorneys.

Patented Sept. 3, 1946

2,407,060

UNITED STATES PATENT OFFICE 2,407,060

FRICTION CLUTCH

Arthur Croft, Rawdon, near Leeds, England

Application June 5, 1944, Serial No. 538,808
In Great Britain July 14, 1943

8 Claims. (Cl. 192—93)

This invention relates to friction clutches, whether of the disc or cone type, having operating mechanism including axially slidable means engaging one of the discs or cone members.

It is customary to provide an adjusting device for taking up any wear of the friction surfaces and a convenient device comprises a nut with means for locking it in an adjusted position. Whilst being effective in operation, in some positions it is difficult of access for setting purposes.

The object of this invention is to produce an adjusting device capable of overcoming the above difficulty and the clutch operating mechanism includes at least two members capable of axial relative and co-active movement with resilient means for releasing their combined pressure on the clutch and further resilient operating and wear adjusting means interposed between the two members for transmitting pressure from one member to the other and thence to the clutch. One of said members may form one part of the clutch or simply engage one of its elements.

The said members are arranged to have a relative operative and release movement and to become engaged against relative movement for co-active release movement. The members may fit one within the other with interposed spring means, and have engaging parts for the co-active release movement. The relative movement between the two members may be so restricted and arranged that there is a minimum clearance between the clutch elements.

Referring now to the accompanying drawing in which two embodiments of the invention are shown by way of example only:

Fig. 1 is a longitudinal sectional elevation showing a multiple disc clutch in and out of action;

Fig. 2 is a longitudinal sectional elevation showing a cone clutch in and out of action.

In the embodiment of the invention shown in Fig. 1, a mutiple disc clutch is furnished with an operating mechanism of the type wherein a longitudinally slidable collar 1 (operated through, say, a strap engaging in the groove 2 in any convenient manner) is adapted to ride over spherical elements such as steel balls 3 and force them radially inwardly between two surfaces 4, 5. Said surfaces are inclined so as to facilitate the movement of the balls which force the surface 5 away from the other surface 4 when operating the clutch. The inclined surface 4 is on a part 6 adjustably secured to a carrier sleeve 7 (to allow for any slight inaccuracies in the size of the various parts) which is keyed or splined on the driving shaft 8 and carries the multiple disc clutch elements 9, 10. The part 6 is shown slidable on the sleeve and retained by a ring 11 which is sprung into position. To adjust the part 6 shims 12 are fitted into position. If desired the part 6 could be screwed on to the sleeve 7 and retained by a locking element such as a spring ring or nut.

The elements 9 have driving engagement through teeth with the said sleeve 7 whilst the elements 10 have similar engagement with a housing 13 secured to the driven shaft 14 in all known manner.

The operating mechanism allows automatically for wear of the clutch discs by the inclusion of two collars 15, 16 fitting one within the other with interposed pressure applying springs 17. The internal collar 15 is mounted on the aforesaid carrier sleeve 7 and its outer end forms the above inclined movable surface 5. The outer collar 16, which engages one of the clutch elements, slides on the internal collar and its relative movement is restricted outwardly by a flange 18, and inwardly by, say, a spring or other stop ring 19. The ring is carried by the internal collar and a shoulder on the outer collar engages it. A feather 20 provides driving connection between the two collars and feathers 21, 22 respectively connect the part 6 and collar 15 to the sleeve 7, whilst the feather 23 connects the collar 1 to the part 6. These feathers allow the required relative movement between the several parts of the operating mechanism whilst ensuring their rotation as one unit.

When the clutch is inoperative, the interposed springs 17 hold the outer collar 16 extended towards the clutch elements 9, 10, with the ring 19 engaging the shoulder of the outer collar, and the two collars are held from the clutch elements by return or release springs 24 interposed between the carrier sleeve 7 and the internal collar. When the balls 3 are forced inwardly the latter collar, through the springs 17, presses the outer collar against the adjacent clutch element 9 and further movement causes the internal collar to slide within the collar 16 (the restricting ring 19 leaving the shoulder of the latter collar and the flange 18 approaching such collar), compress the springs 17 and 24 and apply sufficient pressure through the flange 18 and springs 17 to operate the clutch elements 9, 10. When the balls 3 are released by the retraction of collar 1, the release springs 24 force the internal collar back again and cause the ring 19 to move the outer collar clear of the clutch element 9.

In a modification, the spring or other stop ring 19 is carried by the outer collar and engages a shoulder on the internal collar whilst springs 17 are interposed between the latter collar and a flange at the inner end of the outer collar which bears against the element 9.

In Fig. 2 all the parts of the operating mechanism are similar to those in Fig. 1 with the exception of the outer collar 16 which has a tapered part 25 (instead of the elements 9, 10) forming the male half of a cone clutch. The female half is furnished by the housing 13a having a renewable facing 26. The latter may be on the part 25 or co-acting facings provided.

The above constructions are suitable for disc clutches of the single or multiple plate type, or cone clutches, and can be modified in a variety of ways without departing from the scope of the invention. The clutch mechanism need not be of the ball operated type.

What I claim is:

1. Friction clutch comprising driving and driven clutch elements and operating mechanism, said mechanism including a carrier sleeve, two collars slidable for a limited distance one upon the other, said collars being slidably mounted upon said carrier sleeve, means securing said collars to said sleeve for rotation therewith, stop means between the collars for limiting their relative movement, interposed spring means for urging the two collars apart, spring means between one collar and an axially stationary part for causing a co-active release movement of the two collars, and means for applying operative force to one collar, said last mentioned means comprising spherical elements between end surfaces of one of said collars and of an axially fixed part, and a collar slidable over said spherical elements for forcing the same radially inwardly to apply the clutch operating force.

2. Friction clutch according to claim 1, wherein said end surfaces between which said spherical elements are arranged are tapered.

3. Friction clutch according to claim 1, wherein one of said collars is adapted to apply pressure to one of a number of disc clutch elements which have driving connection with the carrier sleeve and a housing forming the driven part of the clutch.

4. In a friction clutch, the combination with driving and driven clutch elements, of clutch operating mechanism comprising a pair of members mounted one upon the other for relative axial movement, means limiting the relative axial movement of said members, spring means tending to retain said members at the upper limit of their relative axial movement, one of said members having a pressure portion for transmitting clutch-engaging pressure to said clutch elements and the second member having an inclined surface, a plurality of spherical bodies and a stationary surface adjacent the inclined surface of the second member, means for forcing said bodies into operative position between said surfaces to displace said second member axially to transmit axial pressure to said first member through said spring means, and release spring means cooperating with said first spring means to restore said members to their initial clutch released positions upon movement of said forcing means to release said spherical bodies from operative position between said surfaces.

5. In a friction clutch, the invention as recited in claim 4 wherein said first member is separate from and movable independently of said clutch elements.

6. In a friction clutch, the invention as recited in claim 4 wherein said first member constitutes a clutch element.

7. Friction clutch according to claim 1, wherein said axially fixed part is axially slidable on said carrier sleeve, and means is provided for determining the effective axial adjustment of said part with respect to said carrier sleeve.

8. Friction clutch according to claim 1, wherein said axially fixed part is axially slidable on said carrier sleeve; and means for fixing said part in desired axial adjustment with respect to said carrier sleeve comprises a retaining ring seated in a circumferential groove in said carrier sleeve, and shim means of desired axial length between said retaining ring and said axially fixed part.

ARTHUR CROFT.